(12) United States Patent
Kayano et al.

(10) Patent No.: US 11,021,765 B2
(45) Date of Patent: Jun. 1, 2021

(54) SURFACE DETECTION APPARATUS FOR BLAST FURNACE

(71) Applicant: WADECO CO., LTD., Amagasaki (JP)

(72) Inventors: Hayae Kayano, Amagasaki (JP); Kenji Kurose, Amagasaki (JP)

(73) Assignee: WADECO CO., LTD., Amagasaki (JP)

( * ) Notice: Subject to any disclaimer, the term of this patent is extended or adjusted under 35 U.S.C. 154(b) by 215 days.

(21) Appl. No.: 16/335,008

(22) PCT Filed: Sep. 14, 2017

(86) PCT No.: PCT/JP2017/033300
§ 371 (c)(1),
(2) Date: Mar. 20, 2019

(87) PCT Pub. No.: WO2018/056171
PCT Pub. Date: Mar. 29, 2018

(65) Prior Publication Data
US 2019/0249267 A1 Aug. 15, 2019

(30) Foreign Application Priority Data
Sep. 23, 2016 (JP) .............................. JP2016-185702

(51) Int. Cl.
*C21B 7/24* (2006.01)
*G01F 23/284* (2006.01)
(Continued)

(52) U.S. Cl.
CPC .............. *C21B 7/24* (2013.01); *G01F 23/284* (2013.01); *G01S 7/03* (2013.01); *G01S 13/88* (2013.01)

(58) Field of Classification Search
CPC ... C21B 5/008; C21B 7/24; F27B 1/28; F27D 2021/0042; F27D 21/0028; G01F 23/284; G01S 13/88; G01S 7/03
(Continued)

(56) References Cited

U.S. PATENT DOCUMENTS 4,332,374 A 6/1982 Kremer
4,858,892 A * 8/1989 Kreuz ....................... C21B 7/24
266/99
(Continued)

FOREIGN PATENT DOCUMENTS

EP 2730664 * 5/2014 ............. G01S 13/88
JP 2011-033619 A 2/2011
(Continued)

OTHER PUBLICATIONS

International Search Report (PCT/ISA/210), issued by International Searching Authority in corresponding International Application No. PCT/JP2017/033300, dated Nov. 14, 2017.
(Continued)

*Primary Examiner* — Jessee R Roe
*Assistant Examiner* — Michael Aboagye
(74) *Attorney, Agent, or Firm* — Sughrue Mion, PLLC (57) ABSTRACT

A surface detection apparatus for a blast furnace is provided. An antenna is fixed to a side of a container attached to an opening portion of the blast furnace and having a bottom surface opened in correspondence to the opening portion. A reflection plate is disposed in the container immediately above the opening portion so as to face the opening portion and the antenna. A tilt angle varying mechanism and a rotation mechanism for the reflection plate are configured as a double pipe structure and are provided at an anti-antenna side of the reflection plate.

6 Claims, 4 Drawing Sheets

(51) Int. Cl.
*G01S 7/03* (2006.01)
*G01S 13/88* (2006.01)

(58) Field of Classification Search
USPC ............ 266/99, 92, 93, 94, 78, 44; 342/124;
73/290 R; 414/148
See application file for complete search history.

(56) References Cited

U.S. PATENT DOCUMENTS

| | | | | |
|---|---|---|---|---|
| 8,568,652 | B2 * | 10/2013 | Lu | ........................... G01F 23/00 |
| | | | | 266/99 |
| 10,415,107 | B2 * | 9/2019 | Kayano | ................... G01S 13/08 |
| 2017/0016080 | A1 | 1/2017 | Kayano et al. | |
| 2018/0209004 | A1 * | 7/2018 | Kayano | ............... F27D 21/0028 |

FOREIGN PATENT DOCUMENTS

| | | |
|---|---|---|
| JP | 2016-067340 A | 4/2012 |
| JP | 2014-133922 A | 7/2014 |
| JP | 2015-219129 A | 12/2015 |
| LU | 81 158 A1 | 6/1979 |
| WO | 2015133005 A1 | 9/2015 |

OTHER PUBLICATIONS

Written Opinion (PCT/ISA/237) issued by the International Searching Authority in corresponding International Application No. PCT/JP2017/033300, dated Nov. 14, 2017.
Communication dated Jan. 14, 2020, issued by the European Patent Office in counterpart European Application No. 17 852 948.3.
Communication dated Jun. 2, 2020, from the Japanese Patent Office in counterpart application No. 2016-185702.

* cited by examiner

FIG.4
PRIOR ART

SURFACE DETECTION APPARATUS FOR BLAST FURNACE

TECHNICAL FIELD

The present invention relates to an apparatus configured to transmit a detection wave such as a microwave or a millimeter wave into a blast furnace, and to receive the detection wave reflected by iron ore and coke (burden) charged in the furnace, thereby detecting a surface profile of the burden.

BACKGROUND ART

In a blast furnace, an operation is performed while alternately charging iron ore and coke. However, when iron ore and coke (hereinafter referred to as burden) are accumulated as appropriate, a gas flow in the furnace becomes stable, so that the fuel cost can be saved and the service life of the furnace can be increased. To this end, it is necessary to accurately measure a surface profile of the burden in a short time, and to appropriately charge the burden in correspondence to a change in furnace situation.

In a general conventional method of measuring the surface profile, a lance is inserted into the blast furnace from a sidewall of the blast furnace, a detection wave such as a microwave is transmitted from an antenna mounted to a tip end of the lance toward a surface of the burden, and a reflection wave from the surface of the burden is received by the antenna, so that a distance from the antenna to the surface of the burden is measured. In the method, the surface profile of the burden is obtained by performing measurement while moving horizontally the lance.

However, since the lance is linearly moved, a profile of an entire surface of the burden is not obtained. Also, the lance is required to have a length corresponding to about an inner diameter of the furnace, and is a long and high-load member. Therefore, when the lance is inserted in the furnace for a long period of time, it is sagged downward by its own weight, so that the lance cannot be taken out from the furnace. Also, since a stroke upon movement is high, it is necessary to secure a large space outside the furnace. Also, it is necessary to separately provide a drive unit for moving the lance, so that the facility cost and the operating cost increase. In addition, it is not possible to perform the charging operation during the profile measurement, so that it is not possible to perform the rapid charging operation, in correspondence to the measured profile.

Figure 4:
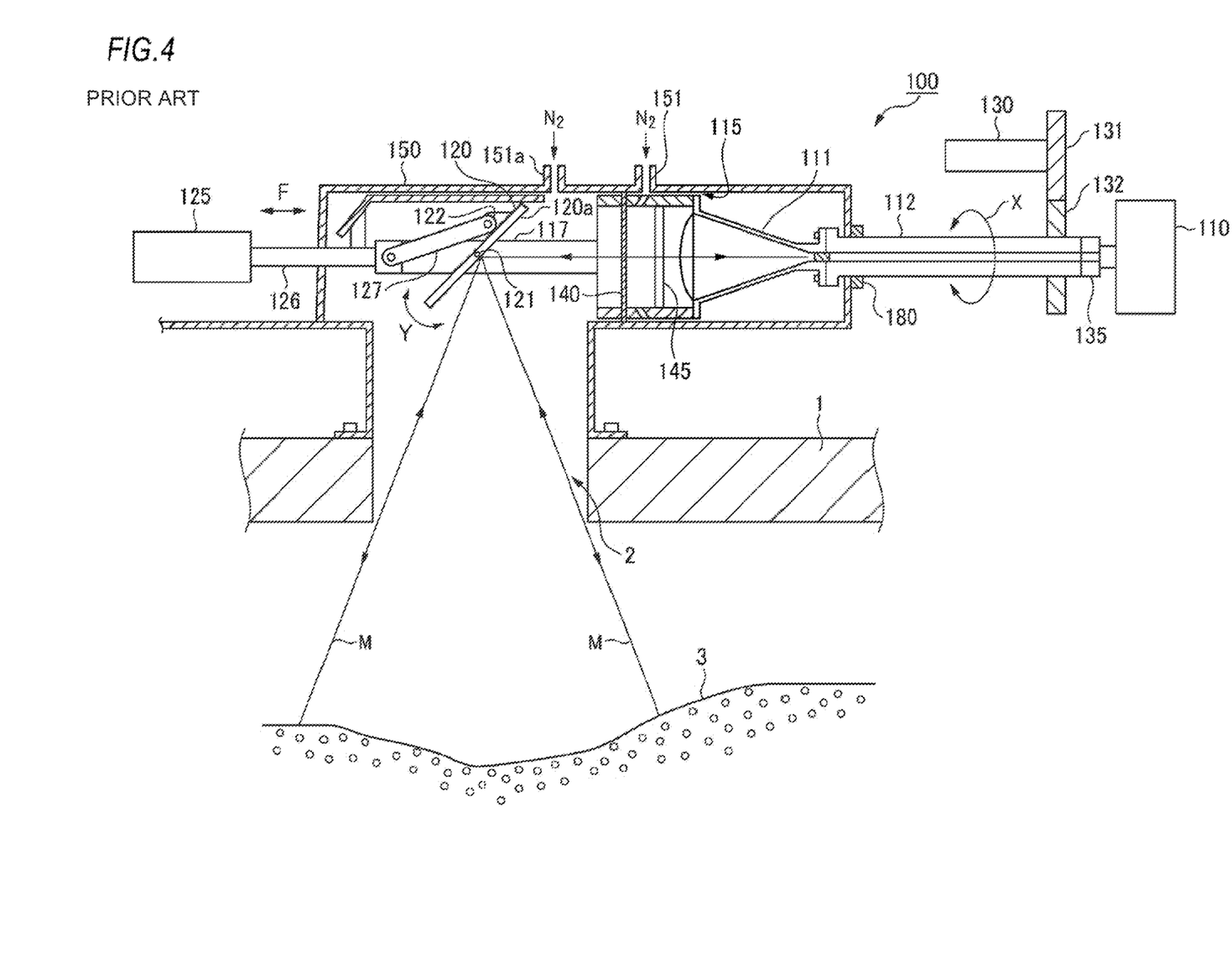
FIG. 4 is a schematic view depicting a surface detection apparatus disclosed in PTL 1.

Therefore, the present applicant has suggested in PTL 1 that a surface profile of a burden is detected in a planar manner by a surface detection apparatus 100 configured as shown in FIG. 4. As shown, in the surface detection apparatus 100, a reflection plate 120 is disposed immediately above an opening portion 2 of a blast furnace 1, and an antenna 111 is disposed to face the reflection plate 120.

A front surface of the antenna 111 is equipped with a coupling member 115, and support members 117, 117 extends from the coupling member 115. Also, the antenna 111 is coupled to a transceiver 110 for a detection wave via a waveguide 112, and a waveguide-side gear 132 is attached to an outer peripheral surface of the waveguide 112. The waveguide-side gear 132 is engaged with a motor-side gear 131 of a motor 130, so that when the motor 130 is driven, the waveguide 112 is rotated in a direction of an arrow X about an axis thereof.

The reflection plate 120 has pin-shaped support shafts 121, 121 protruding from both diametrical ends thereof, and the support shafts 121, 121 are supported with the support members 117, 117. For this reason, the reflection plate 120 is rotated in the direction of the arrow X by the same angle as the rotation of the waveguide 112. By the rotation of the reflection plate 120 in the direction of the arrow X, a detection wave from the antenna 111 is transmitted into the furnace with being swung in a front and rear direction of the drawing sheet.

Also, a back surface of the reflection plate 120 is provided with an attachment piece 122, and the attachment piece 122 is coupled with a rod-shaped member 127 coupled to a tip end of a piston rod 126 of a cylinder 125. When the cylinder 125 is driven, the piston rod 126 is advanced (moved rightward in FIG. 4) or retreated (moved leftward in FIG. 4), as shown with an arrow F. When the piston rod 126 is advanced, the attachment piece 122 is also moved toward the antenna in conjunction with the rod-shaped member 127, and the reflection plate 120 is correspondingly tilted so that a reflection surface 120a is to face toward the opening portion 2 of the blast furnace 1. On the other hand, when the piston rod 126 is retreated, the attachment piece 122 is moved toward an anti-antenna side and the reflection plate 120 is correspondingly tilted so that the reflection surface 120a is to face toward the antenna 111. By such a link mechanism, it is possible to rotate the reflection plate 120 in the direction of the arrow Y about the support shafts 121, 121 by the drive of the cylinder 125. Thereby, the detection wave is transmitted into the furnace with being swung in a right and left direction of FIG. 4, as shown with a reference numeral M.

Therefore, according to the surface detection apparatus 100, by combining the rotations in the direction of the arrow X and in the direction of the arrow Y, it is possible to planarly scan the surface of the burden 3 in the furnace by the detection wave and to obtain a planar surface profile.

CITATION LIST

Patent Literature

[PTL 1] WO 2015/133005

SUMMARY OF INVENTION

Technical Problem

In the surface detection apparatus for a blast furnace, measures for preventing incursion of dust from the furnace interior are implemented. In the surface detection apparatus 100 of PTL 1, a gas impermeable diaphragm 145 and a gas permeable filter 140 made of a heat resistant material (for example, ceramics) through which the detection wave is transmittable are disposed in front of the antenna 111, and an inert gas is supplied to a space between the diaphragm and the filter, so that the inert gas is ejected from the filter 140 toward the reflection plate. Also, the inert gas is supplied to prevent incursion of the dust into the apparatus and adherence of the dust to the reflection surface 120a of the reflection plate 120.

However, since the coupling member 115 is configured to rotate together with the waveguide 112, there is a gap between the coupling member and an inner wall of a container 150, so that it is necessary to seal a coupled part between the container 150 and the waveguide 112 by a gland packing 180 or the like so as to secure the airtightness. Also, the outer peripheral surface of the waveguide 112 is equipped with the waveguide-side gear 132 for rotating the reflection plate 120 and the waveguide in the direction of the arrow X.

For this reason, the waveguide 112 is configured to be long to some extent so as to attach the gland packing 180 and the waveguide-side gear 132. However, since the detection wave from the transceiver 110 is attenuated in the waveguide 112, it is advantageous for the waveguide 112 to be short, in terms of the detection accuracy. Also, a coupler 135 is attached so as not to transmit the rotation of the waveguide 112 to the transceiver 110, which makes the configuration of the apparatus complicated. Furthermore, a length of the coupler 135 is required, in addition to the long waveguide 112, so that a distance from the antenna 111 to the transceiver 110 is further lengthened. As a result, an equipment space of the entire apparatus is also widened.

The present invention has been made in view of the above situations, and an object thereof is to detect a surface profile of a burden in a furnace in a linear manner or in a planar manner, to simplify a configuration of an apparatus, and to extremely shorten a waveguide, thereby reducing attenuation of a detection wave and improving detection accuracy.

Solution to Problem

In order to solve the above problems, the present invention provides a following surface detection apparatus for a blast furnace.

(1) A surface detection apparatus for a blast furnace, the surface detection apparatus to be equipped outside the blast furnace, the surface detection apparatus configured to transmit a detection wave from a transceiver, from an antenna toward a reflection plate, wherein the detection wave is reflected on the reflection plate and transmitted into the furnace through an opening portion of the blast furnace, the detection wave, which has been reflected on a surface of a burden in the furnace and has reached the reflection plate through the opening portion, is reflected on the reflection plate, and the reflected detection wave is transmitted toward the antenna, the surface detection apparatus configured to receive the detection wave at the transceiver, thereby detecting a surface profile of the burden, the surface detection apparatus including:

a container adapted to be attached to the opening portion, the container having a bottom surface a part of which is opened in correspondence to the opening portion;

the reflection plate adapted to disposed in the container immediately above the opening portion;

the antenna disposed to face the reflection plate and fixed to the container; and a tilt angle varying mechanism provided in a space of a side of the reflection plate opposite to the antenna and configured to vary a tilt angle of the reflection plate with respect to an antenna side or an anti-antenna side, and a rotation mechanism configured to rotate the reflection plate by a predetermined angle about a propagation axis of the detection wave, wherein the tilt angle varying mechanism includes a first link one end of which is fixed to an opposite surface of the reflection plate to the antenna, a second link coupled to the first link via a coupling pin, a slider coupled to the second link via a coupling pin, and a slider driving means for advancing or retreating the slider to the antenna side or the anti-antenna side, the rotation mechanism includes a support arm configured to rotatably support support shafts protruding from both diametrical ends of the reflection plate, a pipe body to which the support arm is attached, and a pipe body rotating means for rotating the pipe body about an axis of the pipe body, the tilt angle varying mechanism and the rotation mechanism have a double pipe structure where the slider is an inner pipe and the pipe body is an outer pipe, and the tilt angle varying mechanism and the rotation mechanism are driven in cooperation to linearly or planarly scan the detection wave on the surface of the burden.

(2) The surface detection apparatus for a blast furnace according to (1) above, further including: a cover configured to rotate about the reflection plate, wherein during non-measurement, the cover is moved to a space between the reflection plate and the opening portion to close the opening portion, and during measurement, the cover is moved to an opposite space to the opening portion to open the opening portion.

(3) The surface detection apparatus for a blast furnace according to (2) above, wherein the cover has a cover-side projection piece provided on an inner side of the cover, the support arm configured to support the reflection plate has a reflection plate-side projection piece, and when the reflection plate is rotated, the cover-side projection piece is pushed by the reflection plate-side projection piece, so that the cover is moved between a position during measurement and a position during non-measurement.

(4) The surface detection apparatus for a blast furnace according to any one of (1) to (3) above, wherein the antenna and the transceiver are directly coupled without a waveguide.

(5) The surface detection apparatus for a blast furnace according to any one of (1) to (4) above, wherein the reflection plate is an elliptical plate a minor axis of which is between the support shafts.

(6) The surface detection apparatus for a blast furnace according to any one of (1) to (5) above, wherein one side of the container is opened, and is closed by a detachable antenna attachment wall, and the antenna is attached to the antenna attachment wall, a surface of the container facing the antenna attachment wall is opened, the tilt angle varying mechanism and the rotation mechanism are inserted therethrough, and the rotation mechanism is detachably attached to the opening via a standing piece provided to a bearing on an outer peripheral surface of the pipe body, and during maintenance, the antenna is detached together with the antenna attachment wall, and the tilt angle varying mechanism and the reflection plate are taken out from the opening together with the rotation mechanism.

Advantageous Effects of Invention

According to the surface detection apparatus of the present invention, only the reflection plate is changed in terms of a reflection angle by driving the tilt angle varying mechanism and the rotation mechanism in cooperation. Therefore, the antenna can be fixed to the container, and a mechanism for rotating the antenna and a seal member such as a gland packing are not required, so that it is possible to extremely shorten a length of the waveguide configured to couple the antenna and the transceiver. Also, since the antenna is fixed, a device for rotating the waveguide and a coupler for preventing co-rotation of the transceiver are not required, so that it is possible to simplify the configuration of the apparatus.

DESCRIPTION OF EMBODIMENTS

Hereinafter, the present invention will be described in detail with reference to the drawings.

Figure 1:
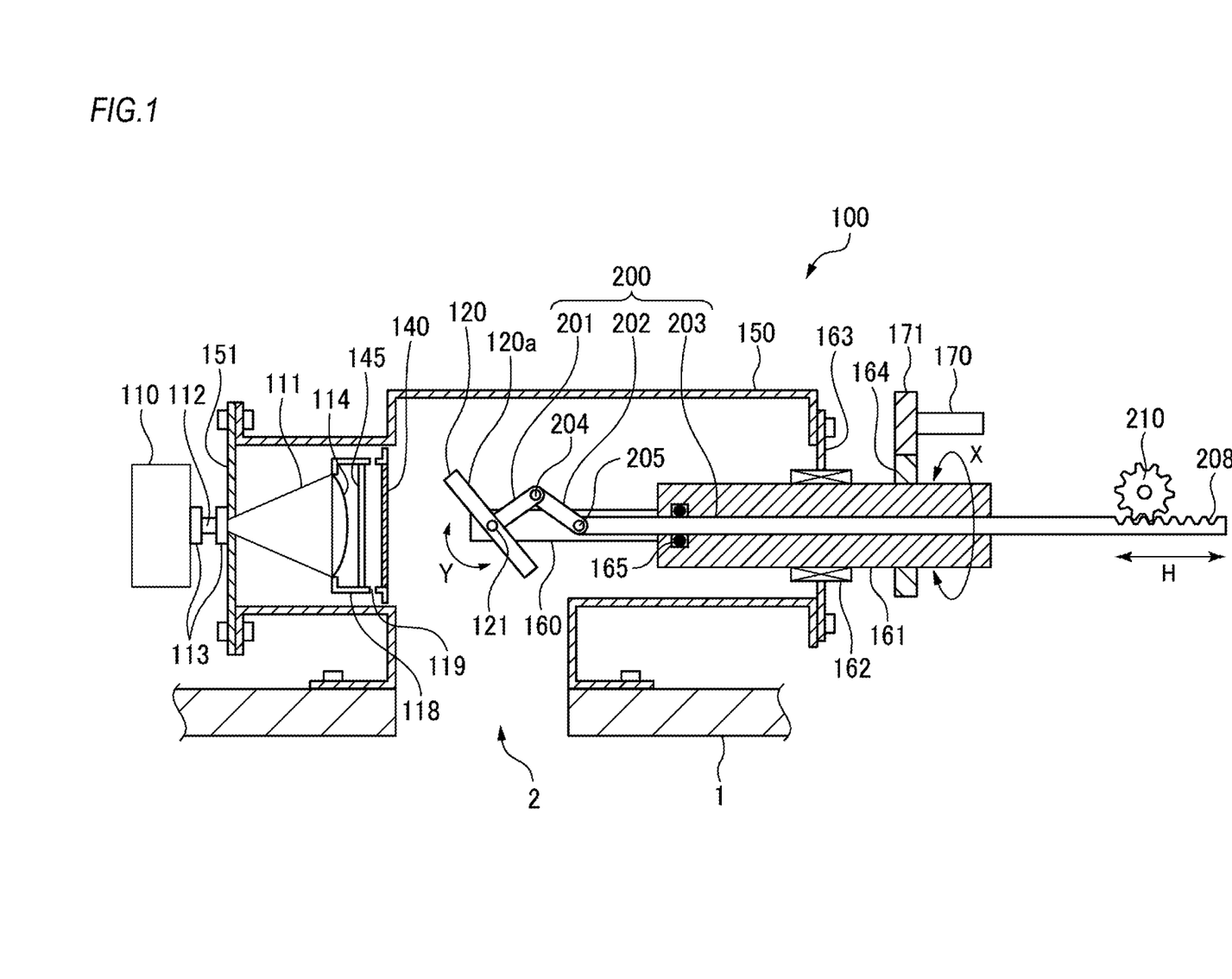
FIG. 1 is a sectional view depicting a surface detection apparatus of the present invention.
Figure 2:
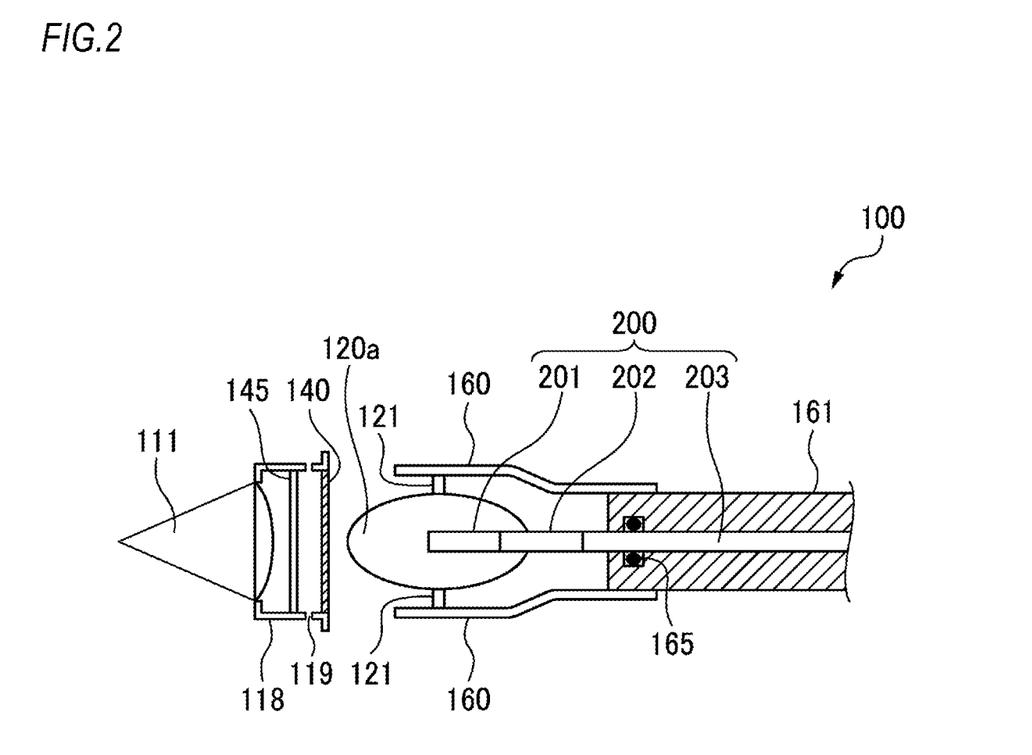
FIG. 2 is a plan view depicting a periphery of an antenna and a reflection plate of the surface detection apparatus shown in FIG. 1.

FIG. 1 is a sectional view depicting an entire structure of a surface detection apparatus of the present invention, and FIG. 2 is a plan view depicting a periphery of an antenna and a reflection plate. As shown, a container 150 is attached to an opening portion 2 of a blast furnace 1. The container 150 has a bottom a part of which is opened in correspondence to the opening portion 2, and is attached continuously to the opening portion 2.

One side (a left end portion, in FIG. 1) of the container 150 is opened, and the opened portion is closed by an antenna attachment wall 151. The antenna attachment wall 151 is detachably attached to the container 150 by a bolt and the like. An antenna 111 is attached to the antenna attachment wall 151. Also, a transceiver 110 for detection wave is coupled to the antenna 111. In the meantime, as the detection wave, a microwave or a millimeter waver may be used.

In the surface detection apparatus 100 of the present invention, since the antenna 111 is not rotated in such a manner as disclosed in PTL 1, the waveguide-side gear 132, the motor 130 and the motor-side gear 131 for rotating the waveguide 112 shown in FIG. 4 are not required and the gland packing 180 is not also required. Therefore, the length of the waveguide 112 can be significantly shortened because only a length required for nuts 113, 113 coupling the antenna 111 and the transceiver 110 has only to be secured. Preferably, the antenna 111 is directly coupled to the transceiver 110 without the waveguide 112.

In this way, since the waveguide 112 is shortened or is not required, it is possible to sufficiently suppress attenuation of the detection wave in the waveguide 112. Also, the coupler 135 shown in FIG. 4 is not also required, so that the waveguide 112 is shortened and the apparatus can be made small as a whole, which reduces the equipment space.

In the meantime, the antenna 111 is not limited to the shown horn antenna. For example, a dielectric lens 114 may be equipped to increase directionality of the detection wave and to shorten a horn length.

A reflection plate 120 is disposed immediately above the opening portion 2 of the container 150. Support shafts 121, 121 protrude from both diametrical ends of the reflection plate 120, and the support shafts 121, 121 are rotatably supported by support arms 160, 160. Also, the support arms 160, 160 are fixed to a reflection plate-side end portion (tip end) of a pipe body 161.

A gear 164 is attached to an outer peripheral surface of the pipe body 161 in the vicinity of a rear end thereof, and is engaged with a gear 171 of a motor 170. The pipe body 161 is configured to rotate in a direction of an arrow X about its own axis by drive of the motor 170. The reflection plate 120 supported by the support arms 160, 160 is configured to rotate in the same direction, in conjunction with the rotation. Also, a bearing 162 is fitted to the outer peripheral surface of the pipe body 161, and is attached to the container 150 via a standing piece 163 attached to an outer ring of the bearing 162. The standing piece 163 is detachably attached to the container 150 by a bolt and the like. By the bearing 162, the pipe body 161 is rotatably supported to the container 150.

A link mechanism 200 is coupled to a back surface 120a of the reflection plate 120. The link mechanism 200 has a first link 201 fixed to a center of the back surface 120a of the reflection plate 120, a second link 202 rotatably coupled to the first link 201 via a coupling pin 204, and a slider 203 rotatably coupled to the second link 202 via a coupling pin 205. The slider 203 is a long rod member having a circular section, and has a rack gear 208 formed at a rear end thereof. The rack gear 208 is engaged with a gear of a motor 210, so that when the motor 210 is driven, the slider 203 is reciprocally moved in a direction of an arrow H. When the slider 203 is advanced toward an antenna side, the reflection plate 120 is tilted downward in FIG. 1 so as to face toward the opening portion 2, and when the slider 203 is retreated toward an anti-antenna side, the reflection plate 120 is tilted upward in FIG. 1 so as to face toward the antenna 111.

The slider 203 is located on an extension line of a propagation axis of a detection wave, which is to be transmitted from the antenna 111, and the support shafts 121, 121 of the reflection plate 120 are also located on the extension line of the propagation axis of the detection wave. For this reason, the reflection plate 120 is configured to rotate in a direction of an arrow Y about the propagation axis of the detection wave, in conjunction with the advance and retreat of the slider 203.

As shown, the pipe body 161 and the slider 203 have a double pipe structure where the pipe body 161 is an outer pipe and the slider 203 is an inner pipe. Also, a reflection plate-side end portion of the slider 203 is formed with a groove, and a seal member 165 such as an O-ring is mounted therein. Thereby, a gap between the slider and the pipe body 161 is closed so that the slider can be slid.

The motor 170 configured to drive the pipe body 161 and the motor 210 configured to drive the slider 203 are driven in cooperation, so that the reflection plate 120 is rotated in the direction of the arrow X and in the direction of the arrow Y. Thereby, the detection wave transmitted from the opening portion 2 scans a surface of a burden in a planar manner, so that a planar surface profile is obtained. In the meantime, only one of the motor 170 and the motor 210 may be driven to rotate the reflection plate 120 in the direction of the arrow X or in the direction of the arrow Y, thereby obtaining a linear surface profile.

In the meantime, the reflection plate 120 may be a circular plate. However, as shown in FIG. 2, an elliptical plate where a line segment sandwiched by the support shafts 121, 121 is a minor axis is preferably used. Since a distance between the antenna 111 and the reflection plate 120 is short, the detection wave from the antenna 111 is mostly traveled to a vicinity of the center of the reflection plate 120. Accordingly, even when the line segment along the support shafts 121, 121 is configured as the minor axis, the reflection of the detection wave is not influenced. When the reflection plate 120 is configured by the elliptical plate, a weight is reduced, as compared to the circular plate, and a load of the motor 170 is also reduced, so that it is possible to increase a speed of the rotation in the direction of the arrow X. Also, since a width between the support arms 160, 160 is narrowed and the pipe body 161 is thinned, the container 150 can be also made small.

Since the dust intrudes through the opening portion 2 from the furnace interior, an inert gas is preferably supplied into the container 150. Also, a gas impermeable diaphragm 145 made of a heat resistant material through which the detection wave is transmittable and a filter 140 made of the same material may be disposed in front of the antenna 111, and the inert gas may be supplied between the filter 140 and the diaphragm 145, thereby ejecting the inert gas from the filter 140 toward the reflection plate. In the meantime, as the filter 140, for example, a woven fabric formed by "Tirano fiber" produced by Ube Industries, Ltd. may be used.

Also, the filter 140 and the diaphragm 145 are attached to a frame body 118 protruding from an opening end edge of the antenna 111, and the inert gas is supplied through a through-hole 119 of the frame body 118 penetrated to a space between the filter 140 and the diaphragm 145, and is ejected from the filter 140. In the meantime, the portion of the frame body 118, to which the filter 140 is attached, is bent toward the container, and a body of the bent portion forms a small gap between the body and an inner wall of the container 150.

Also, as measures against the dust, as shown in FIGS. 3A to 3F, a cover 190 configured to rotate about the reflection plate 120 may be used. In the meantime, FIGS. 3A to 3F depict the reflection plate 120, as seen from the antenna side.

The cover 190 has a circular arc shape, which is a sectional shape perpendicular to an axis thereof, for example, a hemispherical shape, a semi-cylindrical shape or a semi-conical shape a central portion of which has a semi-cylindrical shape and both sides of which gradually decrease toward end portions in diameter. Also, a projection piece 191 (hereinafter, referred to as "cover-side projection piece") is projected from a suitable place (for example, a central portion of the circular arc) of an inner side of the cover 190, both ends of the cover are bent outward to form stoppers 192, and a weight 193 is attached to one stopper 192 (the right stopper, in FIGS. 3A to 3F).

Also, although not shown, the end portions of the cover 190 are fitted in a guide groove formed in the container 150, so that the cover is kept to be slidable in the direction of the arrow X, which is a rotating direction of the reflection plate 120, with being floated in a space outside the reflection plate 120.

In the meantime, a projection piece 128 (hereinafter, referred to as "reflection plate-side projection piece") configured to contact the cover-side projection piece 191 and located on an extension line of the support shaft 121 is projected from one (the right support arm, in FIGS. 3A to 3F) of the support arms 160, 160 configured to support the reflection plate 120. Also, a stopper receiver 152 configured to contact the stopper 192 of the cover 190 is projected from the inner wall of the container 150 at a position facing the support arms 160, 160 or a position slightly below the support arms.

Figure 3A:
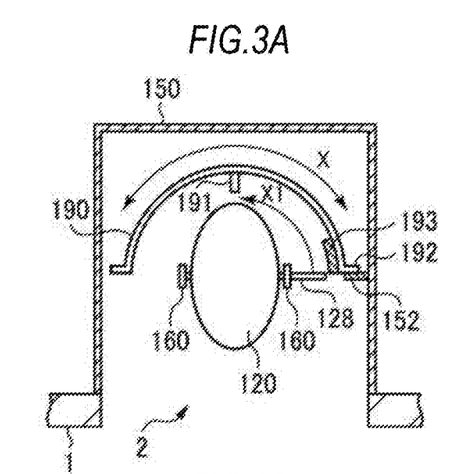
FIGS. 3A to 3F depict movements of a cover when the cover for closing an opening portion of a blast furnace is equipped.

FIG. 3A corresponds to FIG. 1, in which respective positions of the reflection plate 120 and the cover 190 during measurement are shown. As shown, the cover-side projection piece 191 of the cover 190 and the reflection plate-side projection piece 128 of the reflection plate 120 are offset by 90°. Also, one stopper 192 of the cover 190 is put on an upper surface of the stopper receiver 152 of the container 150. In this state, since the stopper 192 of the cover 190 is put on the stopper receiver 152 and the weight 193 is added, the cover 190 is kept at this state during measurement without being rotated to the other side (the left side, in FIGS. 3A to 3F) of the weight 193.

Figure 3B:
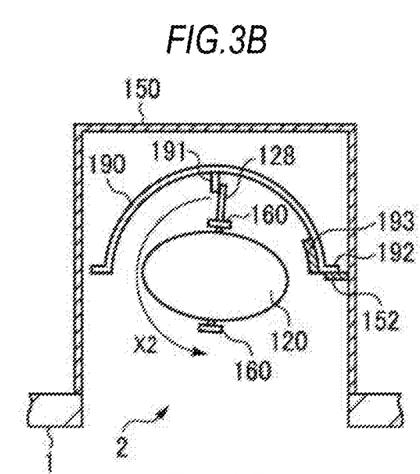
Figure 3C:
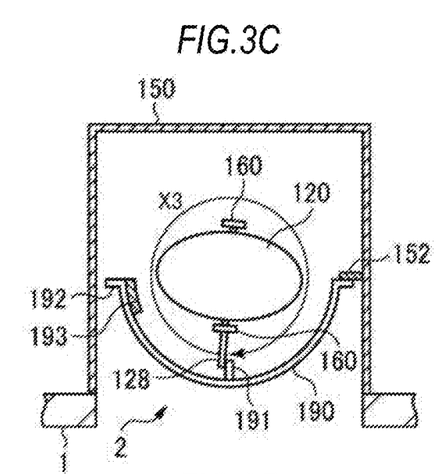
Figure 3D:
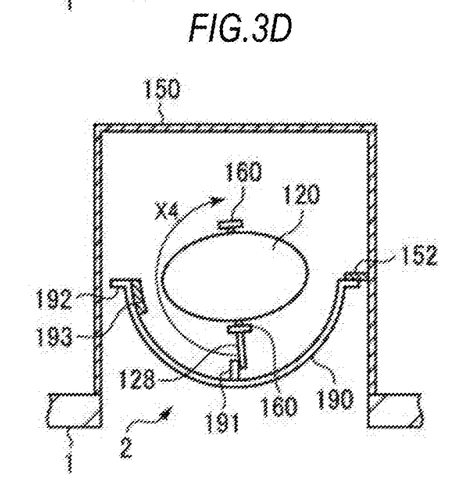

From this state, the reflection plate 120 is rotated by 90°, as shown with the arrow X1, and the reflection plate-side projection piece 128 is correspondingly contacted to the cover-side projection piece 191, so that a state shown in FIG. 3B is formed. From this state, when the reflection plate 120 is further rotated by 180° in the same direction, as shown with the arrow X2, the reflection plate-side projection piece 128 pushes the cover-side projection piece 191 in the same direction and the cover 190 is correspondingly located immediately above the opening portion 2 of the blast furnace, as shown in FIG. 3C. As a result, the opening portion 2 is closed by the cover 190, so that it is possible to protect the reflection plate 120, the filter 140 and the like (refer to FIG. 1) from the dust from the furnace interior, particularly, iron ore and coke having relatively large diameters. FIG. 3C depicts a state during non-measurement.

Figure 3E:
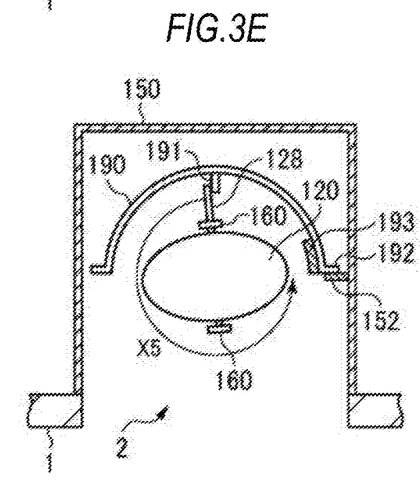
Figure 3F:
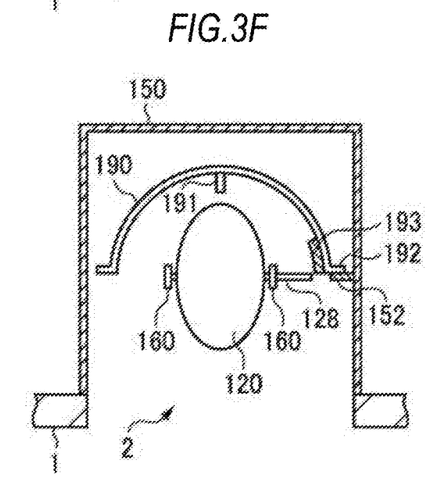

In order to resume measurement from the state during non-measurement shown in FIG. 3C, the reflection plate 120 is first rotated by 360° in an opposite direction, as shown with the arrow X3 in FIG. 3C, thereby bringing the reflection plate-side projection piece 128 into contact with the other surface of the cover-side projection piece 191. Then, the reflection plate 120 is rotated by 180° in the same direction, as shown with the arrow X4 in FIG. 3D. Thereby, the cover-side projection piece 191 pushes the reflection plate-side projection piece 128 in the same direction, so that a state shown in FIG. 3E is formed. Thereafter, the reflection plate 120 is rotated by 270° in the opposite direction, as shown with the arrow X5 in FIG. 3E. Thereby, the cover 190 is moved from the opening portion 2 to the upper of the reflection plate 120, so that the cover is returned to a state of FIG. 3F, i.e., the original state shown in FIG. 3A, the opening portion 2 is opened and the measurement can be thus resumed.

In the meantime, the rotation of the cover 190 can be smoothly performed at high speed by a centrifugal force originating from the weight 193.

Like this, when opening and closing the opening portion 2 of the blast furnace 1 by the cover 190, the reflection plate 120 has only to be rotated as shown, so that it is not necessary to provide a separate mechanism for rotating the cover 190. It is general to provide the opening portion 2 with an opening/closing valve and to open/close the same with the opening/closing valve. Compared to this configuration, it is possible to simplify the configuration of the apparatus. Also, since the cover 190 is not coupled with the pipe body 161 configured to rotate the reflection plate 120, the cover is not rotated in conjunction with the rotation of the reflection plate 120 during measurement. The cover 190 is a heavy member made of steel plate or the like and having a thickness to some extent so as to endure collision with iron ore and coke having relatively large diameters from the furnace interior. For this reason, if the cover is rotated in conjunction with the rotation of the reflection plate 120, a load to be applied to the motor 170 configured to rotate the pipe body 161 increases. However, the load problem does not occur. Also, the cover 190 may be coupled to the pipe body 161.

As described above, since the antenna 111 is attached to the antenna attachment wall 151 of the container 150, when the antenna attachment wall 151 is detached from the container 150, the antenna 111 and the diaphragm 145 and filter 140 coupled to the antenna 111 can be taken out from the container 150, and the antenna 111 and the diaphragm 145 and filter 140 can be subjected to maintenance with the container 150 being attached to the blast furnace 1.

Also, the pipe body 161 and the slider 203 have the double pipe structure, are integrally configured as a whole, and are attached to the container 150 by the bolt and the like via the standing piece 163 provided to the bearing 162 of the pipe body 161. Therefore, when the reflection plate 120 is tilted to be substantially flush with the slider 203 and the pipe body 161 is taken out from the container 150, the reflection plate 120, the link mechanism 200, the rotation means, and the cover 190 can be subjected to the maintenance with the container 150 being attached to the opening portion 2.

Like this, it is possible to easily perform the maintenance for the antenna 111 and the reflection plate 120.

Also, although not shown, a part of the container 150 above the reflection plate 120 is provided with an observation window, and when the reflection plate 120 is rotated to face the observation window, it is possible to observe the attached state of the dust to the reflection plate 120.

Although the present invention has been described in detail with reference to the specific embodiment, it is obvious to one skilled in the art that a variety of changes and modifications can be made without departing from the spirit and scope of the present invention.

The subject application is based on Japanese Patent Application No. 2016-185702 filed on Sep. 23, 2016, the contents of which are incorporated herein by reference.

Industrial Applicability

According to the surface detection apparatus of the present invention capable of linearly or planarly detecting the surface profile of the burden in the furnace, it is possible to simplify the configuration of the apparatus and to extremely shorten the waveguide, thereby reducing attenuation of the detection wave and improving the detection accuracy.

REFERENCE SIGNS LIST

1: blast furnace
2: opening portion
3: burden
100: surface detection apparatus
110: transceiver
111: antenna
112: waveguide
120: reflection plate
121: support shaft
128: reflection plate-side projection piece
140: filter
145: diaphragm
150: container
151: antenna attachment wall
152: stopper receiver
160: support arm
161: pipe body
162: bearing
163: standing piece
164: gear
165: seal member
170: motor
171: gear
190: cover
191: cover-side projection piece
192: stopper
193: weight
200: link mechanism
201: first link
202: second link
203: slider
208: rack gear
210: motor

The invention claimed is:

1. A surface detection apparatus for a blast furnace, the surface detection apparatus to be equipped outside the blast furnace, the surface detection apparatus configured to transmit a detection wave from a transceiver, from an antenna toward a reflection plate, wherein the detection wave is reflected on the reflection plate and transmitted into the furnace through an opening portion of the blast furnace, the detection wave, which has been reflected on a surface of a burden in the furnace and has reached the reflection plate through the opening portion, is reflected on the reflection plate, and the reflected detection wave is transmitted toward the antenna, the surface detection apparatus configured to receive the detection wave at the transceiver, thereby detecting a surface profile of the burden, the surface detection apparatus comprising:

a container adapted to be attached to the opening portion, the container having a bottom surface a part of which is opened in correspondence to the opening portion;

the reflection plate adapted to be disposed in the container immediately above the opening portion; and the antenna disposed to face the reflection plate and fixed to the container; and a tilt angle varying mechanism provided in a space of a side of the reflection plate opposite to the antenna and configured to vary a tilt angle of the reflection plate with respect to an antenna side or an anti-antenna side, and a rotation mechanism configured to rotate the reflection plate by a predetermined angle about a propagation axis of the detection wave, wherein the tilt angle varying mechanism comprises a first link one end of which is fixed to an opposite surface of the reflection plate to the antenna, a second link coupled to the first link via a coupling pin, a slider coupled to the second link via a coupling pin, and a slider driving means for advancing or retreating the slider to the antenna side or the anti-antenna side, the reflection plate including diametrically opposing ends, the rotation mechanism comprises a support arm configured to rotatably support support shafts, the support shafts protruding from the diametrically opposing ends of the reflection plate, a pipe body to which the support arm is attached, and a pipe body rotating means for rotating the pipe body about an axis of the pipe body, the tilt angle varying mechanism and the rotation mechanism have a double pipe structure where the slider is an inner pipe and the pipe body is an outer pipe, and the tilt angle varying mechanism and the rotation mechanism are driven in cooperation to rotate the reflection plate, thereby linearly or planarly scan the detection wave transmitted on the surface of the burden.

2. The surface detection apparatus for a blast furnace according to claim 1, further comprising: a cover configured to rotate about the reflection plate, wherein during non-measurement, the cover is moved to a space between the reflection plate and the opening portion to close the opening portion, and during measurement, the cover is moved to an opposite space to the opening portion to open the opening portion.

3. The surface detection apparatus for a blast furnace according to claim 2, wherein the cover has a cover-side projection piece provided on an inner side of the cover, the support arm configured to support the reflection plate has a reflection plate-side projection piece, and when the reflection plate is rotated, the cover-side projection piece is pushed by the reflection plate-side projection piece, so that the cover is moved between a position during measurement and a position during non-measurement.

4. The surface detection apparatus for a blast furnace according to claim 1, wherein the antenna and the transceiver are directly coupled without a waveguide.

5. The surface detection apparatus for a blast furnace according to claim 1, wherein the reflection plate is an elliptical plate a minor axis of which is between the support shafts.

6. The surface detection apparatus for a blast furnace according to claim 1, wherein one side of the container is opened, and is closed by a detachable antenna attachment wall, and the antenna is attached to the antenna attachment wall, a surface of the container facing the antenna attachment wall is opened, the tilt angle varying mechanism and the rotation mechanism are inserted therethrough, and the rotation mechanism is detachably attached to the opening via a standing piece provided to a bearing on an outer peripheral surface of the pipe body, and during maintenance, the antenna is detached together with the antenna attachment wall, and the tilt angle varying mechanism and the reflection plate are taken out from the opening together with the rotation mechanism.

* * * * *